United States Patent
Kang et al.

(10) Patent No.: US 11,175,064 B2
(45) Date of Patent: Nov. 16, 2021

(54) ANALYTICS BASED CHILLER SEQUENCING

(71) Applicant: Carrier Corporation, Beach Gardens, FL (US)

(72) Inventors: Keunmo Kang, San Diego, CA (US); Sheng Li, Shanghai (CN); Xing Cai, Shanghai (CN); Xinyu Wu, Shanghai (CN); Marcin Cychowski, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/515,092

(22) Filed: Jul. 18, 2019

(65) Prior Publication Data

US 2020/0025407 A1 Jan. 23, 2020

(30) Foreign Application Priority Data

Jul. 18, 2018 (CN) .......................... 201810808654.5

(51) Int. Cl.
*F24F 11/75* (2018.01)
*F24F 11/38* (2018.01)
(Continued)

(52) U.S. Cl.
CPC .............. *F24F 11/75* (2018.01); *F24F 11/38* (2018.01); *G05D 23/1931* (2013.01); *G06F 16/24578* (2019.01); *F24F 2110/10* (2018.01)

(58) Field of Classification Search
CPC ........ F24F 11/38; F24F 11/75; F24F 2110/10; G05D 23/1931; G06F 16/24578; F25B 49/022; G05B 19/04; G06Q 10/06316
See application file for complete search history.

(56) References Cited

U.S. PATENT DOCUMENTS

| 6,438,981 B1 | 8/2002 | Whiteside |
| 6,718,779 B1 | 4/2004 | Henry |

(Continued)

FOREIGN PATENT DOCUMENTS

| WO | 2016148651 A1 | 9/2016 |
| WO | 2018004464 A1 | 1/2018 |

OTHER PUBLICATIONS

Liao et al., "Uncertainty Analysis for Chiller Sequencing Control" Energy and Buildings, City University of Hong Kong, Dec. 2014, pp. 187-198, https://www.researchgate.net/publication/266678120_Uncertainty_analysis_for_chiller_sequencing_control, 13 pages.

*Primary Examiner* — Tejal Gami

(74) *Attorney, Agent, or Firm* — Cantor Colburn LLP

(57) ABSTRACT

Embodiments include a system and method for performing analytics based chiller sequencing. Embodiments include a plurality of chillers, a system controller configured to control the plurality of chillers, and one or more sensors in communication with the controller, the one or more sensors configured to generate operational data based on measured operational parameters of the plurality of chillers. Embodiments include the controller including a processor configured to obtain the operational data, calculate scores for each of the plurality of chillers based on the operational data, and rank the plurality of chillers based on the scores. The processor is further configured to sequence the plurality of chillers based at least in part on the ranking, and control operation of the plurality of chillers based on the sequencing.

20 Claims, 4 Drawing Sheets

(51) Int. Cl.
*G05D 23/19* (2006.01)
*G06F 16/2457* (2019.01)
*F24F 110/10* (2018.01)

(56) References Cited

U.S. PATENT DOCUMENTS

| | | |
|---|---|---|
| 8,291,720 B2 | 10/2012 | Hartman |
| 9,002,532 B2 | 4/2015 | Asmus |
| 9,081,394 B2 | 7/2015 | Kates |
| 9,639,413 B2 | 5/2017 | Drees et al. |
| 9,785,902 B1 | 10/2017 | Fontaine et al. |
| 9,915,178 B2 | 3/2018 | Sun et al. |
| 9,967,107 B2 | 5/2018 | Jones et al. |
| 2004/0068996 A1 | 4/2004 | Tseng |
| 2006/0071089 A1* | 4/2006 | Kates ................ G05D 23/1934 236/94 |
| 2010/0198409 A1* | 8/2010 | Hartman ............ F04D 27/0284 700/275 |
| 2013/0098084 A1 | 4/2013 | Matsuo et al. |
| 2018/0046173 A1 | 2/2018 | Ahmed |

\* cited by examiner

ANALYTICS BASED CHILLER SEQUENCING

CROSS-REFERENCE TO RELATED APPLICATIONS

This application claims the benefit of Chinese Application No. 201810808654.5 filed Jul. 18, 2018, which is incorporated herein by reference in its entirety.

BACKGROUND

The present disclosure relates generally to chillers, and more specifically to performing analytics based chiller sequencing.

In today's environment, chillers are used to provide cooling to buildings and structures of all sizes. The chillers, together with many other types of equipment, construct the entire cooling system to condition an interior space. For example, chillers include various sensors, motors, condensers, evaporators, etc. And other equipment in the cooling system include pumps, cooling towers, air handlers, meters, etc. A large scale cooling system may include multiple chillers for good energy efficiency in partial load conditions. As the chillers are operated over time, the chillers may exhibit some variation in performance due to the aging or fatigue wear of its mechanical components. Although the chillers remain operational, the performance can vary across a relatively wide range because of performance degradation. Different chillers in the system may have different level of performance degradation. Therefore, there is a need to optimize the sequencing of chillers to maximize the overall performance of the system and minimize the further degradation of the chillers.

BRIEF DESCRIPTION

According to one embodiment, a system for performing analytics based chiller sequencing is provided. The system includes a plurality of chillers; a controller configured to control the plurality of chillers, and one or more sensors in communication with the controller, the one or more sensors configured to generate operational data based on measured operational parameters of the plurality of chillers. The controller includes a processor configured to obtain operational data, calculate scores for each of the plurality of chillers based on the operational data, and rank the plurality of chillers based on the scores. The processor is further configured to sequence the plurality of chillers based at least in part on the ranking, and control operation of the plurality of chillers based on the sequencing In addition to one or more of the features described above, or as an alternative, further embodiments may include scores for each chiller that include at least one of an efficiency score and a health score.

In addition to one or more of the features described above, or as an alternative, further embodiments may include scores that are weighted score of the at least one efficiency score and health score.

In addition to one or more of the features described above, or as an alternative, further embodiments may include a processor that is configured to calculate the efficiency score based on a chilled water capacity and power consumed for each chiller.

In addition to one or more of the features described above, or as an alternative, further embodiments may include a processor that is configured to estimate the efficiency score based on an estimated chilled water capacity and power consumed for each chiller.

In addition to one or more of the features described above, or as an alternative, further embodiments may include a health score that is based on a chilled water supply temperature and a chiller water supply temperature setpoint for each chiller.

In addition to one or more of the features described above, or as an alternative, further embodiments may include a health score that is based on at least one of a mechanical fatigue wear status, a noise level, or a vibration level.

In addition to one or more of the features described above, or as an alternative, further embodiments may include a ranking that includes performing a first ranking based on the efficiency score and performing a second ranking based on the health score.

In addition to one or more of the features described above, or as an alternative, further embodiments may include a controller that is configured to resequence the plurality of chillers at a configurable interval.

According to one embodiment, a method for performing analytics based chiller sequencing is provided. The method includes obtaining operational data for each chiller of a plurality of chillers, calculating scores for each of the plurality of chillers based on the operational data, and ranking the plurality of chillers based on the scores. The method also includes sequencing the plurality of chillers based at least in part on the ranking, and controlling operation of the plurality of chillers based on the sequencing.

In addition to one or more of the features described above, or as an alternative, further embodiments may include scores for each chiller that include at least on of an efficiency score and a health score.

In addition to one or more of the features described above, or as an alternative, further embodiments may include weighting at least one of the efficiency score and the health score.

In addition to one or more of the features described above, or as an alternative, further embodiments may include calculating the efficiency score based at least in part on a chilled water capacity and power consumed for each chiller.

In addition to one or more of the features described above, or as an alternative, further embodiments may include estimating the efficiency score based at least in part on an estimated chilled water capacity and power consumed for each chiller.

In addition to one or more of the features described above, or as an alternative, further embodiments may include a health score that is based on a chilled water supply temperature and a chilled water supply temperature setpoint for each chiller.

In addition to one or more of the features described above, or as an alternative, further embodiments may include a health score that is based on at least one of a mechanical fatigue wear status, a noise level, or a vibration level.

In addition to one or more of the features described above, or as an alternative, further embodiments may include performing a first ranking based on the efficiency score and performing a second ranking based on the health score.

In addition to one or more of the features described above, or as an alternative, further embodiments may include resequencing the plurality of chillers at a configurable interval.

In addition to one or more of the features described above, or as an alternative, further embodiments may include calculating the efficiency score when flow sensor data for each chiller is available.

In addition to one or more of the features described above, or as an alternative, further embodiments may include estimating the efficiency score when flow sensor data for each chiller is unavailable.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Chiller performance can degrade over time due to aging and failing elements of the chiller. For example, chillers may experience mechanical degradation such as reduced condenser performance, failing pumps, motors in need of repair, etc. Oftentimes, the chiller plant operators and the chiller plant manager/control fail to realize such problems because the chillers remain operational. Therefore, they are unable to adjust chiller operation accordingly to actively manage the operational efficiency. Using the chiller efficiency alone fails to maximize the overall system efficiency because a particular chiller may be operating efficiently while being unable to obtain the desired cooling requested at the load or some other health issue such as mechanical fatigue wear, abnormal noise, vibration, etc. may exist. The techniques described herein maximize the overall chiller system performance by sequencing an order of chiller operation based on the measured chiller efficiency and health values.

Using the chiller system analytics, the chiller system control determines the efficiencies and health of the individual chillers. Next the chillers are ranked according to their efficiency and health. Subsequently, the sequencing order is determined to optimize the chiller group efficiency of the chiller plant system. In addition, the chiller plant control can automatically adjust chiller sequencing based on the updated system analytics. Therefore, the system is not required to rely on an operator to identify a degraded performance of a chiller and take corrective action accordingly.

Figure 1:
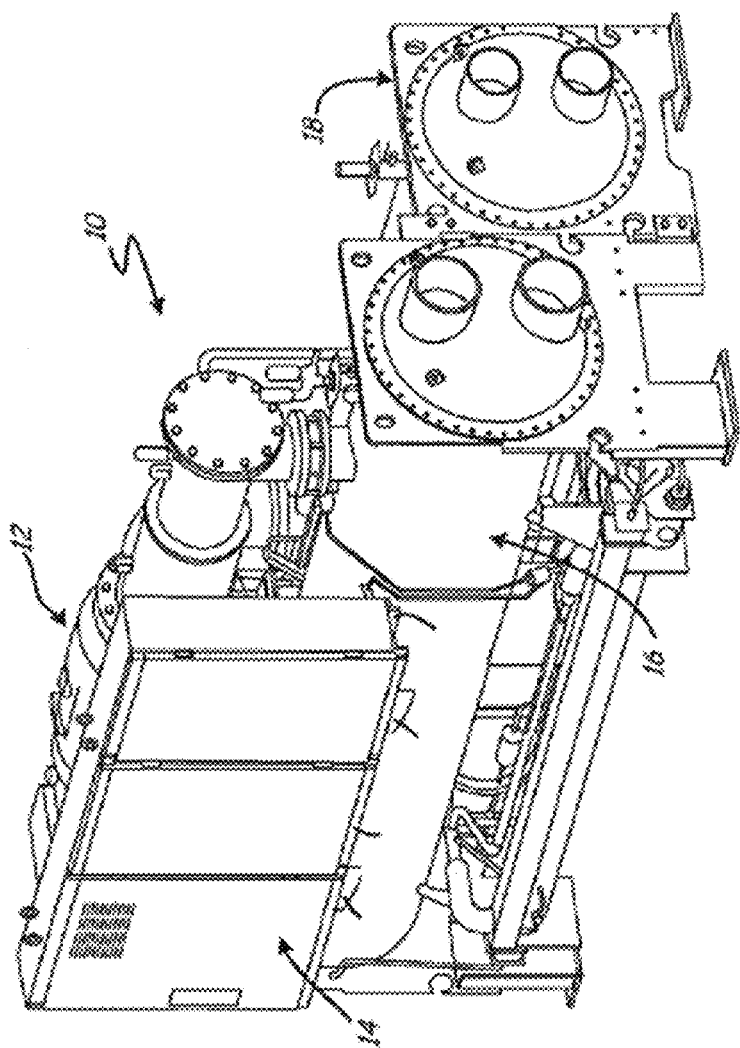
FIG. 1 is a perspective view of a chiller system in an accordance with one or more embodiments.

FIG. 1 depicts a chiller system 10 in accordance with one or more embodiments. Chiller system 10 is a screw chiller, but embodiments are appropriate for use with other compression chiller assemblies, such as, for example, a centrifugal chiller. As shown in FIG. 1, chiller system 10 includes compressor 12, variable frequency drive 14, condenser 16 and cooler 18.

In operation, gaseous refrigerant is induced into compressor 12 and compressed. Compressor 12 is driven by a motor under the control of variable frequency drive 14. Variable frequency drive 14 controls the frequency of the alternating current (AC) supplied to the motor thereby controlling the speed of the motor and the output of compressor 12. It is to be understood that the techniques described herein are independent of chiller type such as variable speed chillers and can also be applied to fixed speed chillers. After the refrigerant is compressed, the high temperature, high pressure refrigerant gas is supplied to condenser 16. In condenser 16, the gaseous refrigerant condenses into liquid as it gives up heat. The condensed liquid refrigerant then flows into cooler 18, which circulates chiller water. The low pressure environment in cooler 18 causes the refrigerant to change states to a gas and, as it does so, it absorbs the required heat of vaporization from the chilled water, thus reducing the temperature of the water. The low pressure vapor is then drawn into the inlet of compressor 12 and the cycle is continually repeated. The chilled water is circulated through a distribution system to cooling coils for comfort air conditioning.

Figure 2:
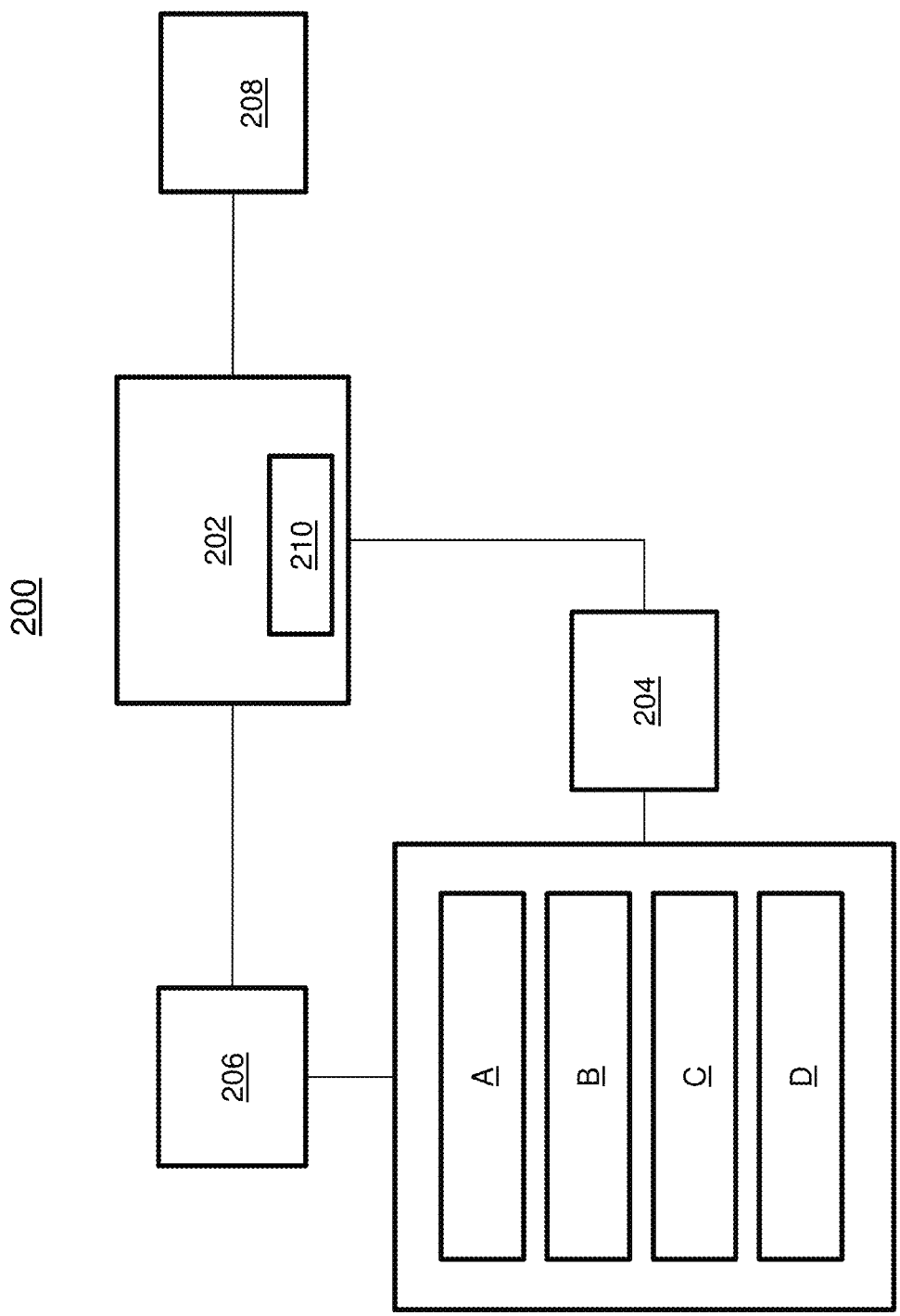
FIG. 2 depicts a system for performing analytics based chiller sequencing in accordance with one or more embodiments.

Referring now to FIG. 2, a chiller system 200 in accordance with one or more embodiments is shown. In one or more embodiments, the chiller system 200 includes a plurality of chillers where each chiller can be a chiller such as the chiller 10 shown in FIG. 1.

The chiller system 200 includes a controller 202 that is configured to control various operations of the chiller system 200. The chiller system 200 includes a group of chiller A, B, C, D, that are similar to the chiller shown in FIG. 1. Although only four chillers are shown, it should be understood that any number of chillers can be used and sequenced by the described techniques. Each of the chillers in the group include respective input sensors 204 and output sensors 206 to measure different characteristics of the chillers A-D. For example, the input and output sensors 204, 206 include temperature sensors, flow meters, pressure sensors, etc. In addition, the system 200 can include sensors to detecting the voltage and current for a motor or other electrical component(s) of the system 200.

The controller 202 is configured to receive the readings from the sensors and control the various operations of the chillers. For example, the coefficient of performance (COP), also referred to as chiller efficiency, can be calculated and/or estimated using data from the sensors. In addition, the health of the chillers can be calculated using the data collected from the sensors.

In one or more embodiments, the controller 202 includes a processor 210 that is configured to calculate and estimate the COP and the health score for the chiller system 200.

In a scenario where the chilled water flow sensors of the chiller are available, such as sensors 204, 206, the COP can be calculated according to the following Equation 1:

$$COP = \frac{Cap}{Power} \quad \text{(Eq. 1)}$$

where the capacity (cap) is calculated from Equation 2 (shown below). Power is measured from the motor coupled to the chiller using current and voltage, or the power can be measured directly with a power meter. Equation 2 provides:

$$Cap = c_w \times m_{chw} \times \Delta T_{chw} \qquad (Eq.\ 2)$$

where $c_w$—specific heat of water; $m_{chw}$—flow rate of chilled water through the chiller; $\Delta T_{chw}$—difference between the input chilled water temperature and output chilled water temperature.

In a different scenario where the chilled water flow sensor is unavailable, the COP can be estimated for each chiller based on the available reference loop variables measurement from the chiller local controller performing the chiller operation is provided below.

First, the refrigerant flow rate through the compressor must be estimated which is estimated using the following Equation 3:

$$IP \times \eta_{motor} = q_m \times (h_2 - h_1) \qquad (Eq.\ 3)$$

wherein IP—input power of motor; $\eta_{motor}$—motor efficiency; $q_m$—refrigerant flow rate; $h_2$—compressor outlet enthalpy; $h_1$—compressor inlet enthalpy.

Next, the chiller capacity is estimated by the following Equations 4 and 5:

$$q_0 = q_m \times (h_1 - h_5) \qquad (Eq.\ 4)$$

$$Q = q_0 - IP \times (1 - \eta_{motor}) \qquad (Eq.\ 5)$$

where $q_m$—refrigerant flow rate; $h_1$—evaporator outlet enthalpy; $h_5$—evaporator inlet enthalpy; IP—input power of motor; Q—chiller capacity.

Finally, the chiller efficiency is estimated based on the following equation 6:

$$COP = Q/IP \qquad (Eq.\ 6)$$

In one or more embodiments either the calculated COP (Eq. 1) or the estimated COP (Eq. 6) is used to calculate the chiller efficiency score based on following equation 7:

$$\text{Efficiency Score} = 100 \times COP/COP_{ref} \qquad (Eq.\ 7)$$

where $COP_{ref}$—the user selected reference COP value of health chiller. It should be noted that Eq. 7 is a non-limiting example, where the value 100 can be selected to be a different value and the equation form can be selected as any other monotone increasing function. In this particular example, the value 100 is used to indicate a chiller having an efficiency greater than or equal to the $COP_{ref}$ is considered an efficient chiller having a score greater than 100. A chiller having a score less than the $COP_{ref}$ is considered an inefficient chiller. It is to be understood that in other configurations a different value can be used in Eq. 7, instead of 100.

In one or more embodiments, the reference COP of the health of a chiller can be an average of the normal COP of the chillers in the system from manufacturer data. The efficiency score is used to rank the chillers in the system as described above.

In addition to using chiller efficiency as a factor for sequencing the order of a group of chillers, the chiller health can also be considered. A health score representing the health of a chiller measures the average temperature error at the evaporator outlet to determine if the desired chilled water temperature is being delivered to the load. For example, if a chiller is unable to deliver the chilled water temperature in reference to the chilled water supply temperature setpoint, then the chiller is given a low priority to operate.

In one or more embodiments, the health score of each chiller is correlated to the average chilled water temperature error $T_{av\_error}$ and is calculated by Equation 8:

$$T_{av\_error} = \frac{\sum_{i=1}^{N}(CHWST - CHWST_{sp})}{N} \qquad (Eq.\ 8)$$

where N identifies the number of data samplings; CHWST—chilled water supply temperature; CHWSTsp—chilled water supply temperature setpoint.

In one or more embodiments, chiller health score is calculated based on following equation 9:

$$\text{Health Score} = 100 + 50 \times (1 - T_{av\_error}/T_{av\_error\_ref}) \qquad (Eq.\ 9)$$

where $T_{av\_error\_ref}$—the reference value of average chilled water temperature error of health chiller. It should be noted Eq. 9 is a non-limiting example where the values 100 and 50 can be selected to be different values and the equation form can be selected as any other monotone decreasing function. In this particular example, the values 100 and 50 are used to indicate a chiller having an error equal to the reference error value is considered a healthy chiller and the score is 100. Also a chiller having an error 3 times as much as the reference error value is considered a very unhealthy chiller and the score is 0. While the values 100 and 50 are used in this example, another other values can be selected based on the desired configuration.

In one or more embodiments, a margin of error for chiller temperature can have a range of ±0.3° F., i.e., $T_{av\_error\_ref} = 0.3°$ F. In this case, a chiller having an error greater than 1° F. is considered an unhealthy chiller, as its health score is 0. In some instances an unhealthy chiller can operate efficiently. The higher the chilled water supply temperature of an unhealthy chiller, less power will be consumed to produce the requested cooling. However, because the temperature control is not optimal, this particular chiller will not be selected as the first priority, although it may have a high efficiency.

In one or more embodiments, other sensor variables such as mechanical fatigue wear status, noise level, vibration level, etc., could be also used to calculate the chiller health score. For example, a chiller having noise value greater than some reference value is considered unhealthy chiller, and a health score for noise could be calculated as a monotone decreasing function of noise value. Similarly, one could also get the health score for vibration if vibration sensor value is available, and the health score for mechanical fatigue wear if mechanical fatigue wear sensor value is available.

In one or more embodiments, a weight factor can be introduced into the calculation to determine the efficiency and health scores. For example, the efficiency score can be weighted at 1 and the health score at 2 to adjust the priority in the scores. In this example, the chiller health score has first priority over the efficiency score for each chiller, where the health score is weighted at twice the efficiency score. An efficiently operated chiller that is unable to deliver the desired cooling because of the high chilled water supply temperature or has some other health issues such as mechanical fatigue wear, abnormal noise, vibration, etc. will receive a lower priority in sequencing each of the chillers. In another example, the efficiency score can be weighted at 1 and the health score weighted at 0.5, where the efficiency is provided first priority over the health score in sequencing the chillers. In other embodiments, weight factors can also be used to calculate a final health score based on the health score for chiller temperature (Eq. 8 and Eq.9) and the individual health scores for mechanical fatigue or wear, noise level, vibration level, etc. For example, a separate health score can be calculated for each parameter such as the chilled water supply temperature, the mechanical fatigue, the noise level, the vibration level, etc. It should also be understood that additional parameters or any combination of parameters can be used to determine a respective health score when calculating the final health score. Responsive to calculating each of the health scores for each monitored parameter, the health scores can be combined, such as by averaging each of the scores for the plurality of parameters, to calculate the final health score. Also, the weight factors can be applied to each of the monitored parameters to provide a priority of importance of each of the monitored parameters. The weight factors are configurable weight factors and can be modified according to the desired management of the chiller system. In a non-limiting example, the vibration level health score, such as the vibration experienced by a compressor of the chiller system, can be given a higher weight/priority over the noise level health score. In another example, the mechanical fatigue health score, which can be based on an age of the equipment or other factors, is given a higher weight/priority compared to the noise level and vibration level health scores. It should be understood the chiller system and controller include the appropriate interfaces and sensors to monitor the parameters for calculating the respective health scores and final health scores.

Responsive to determining the COP and health for each chiller, a sequencing operation is performed to select which particular chiller to bring online. The results of the calculation, estimation, and sequencing can be output to another system or device 208. For example, the data can be sent to an operator at a remote location for further analysis. In addition, graphical information (presented in FIG. 3) can be sent to a system or display for presentation to an operator.

The system is optimized by sequencing the controller to operate the highest efficiency and healthiest chiller first. Subsequently, if the load is not maintained according to a desired setpoint a second prioritized chiller can be operated and then a third and fourth chiller and so on if necessary.

Figure 3:
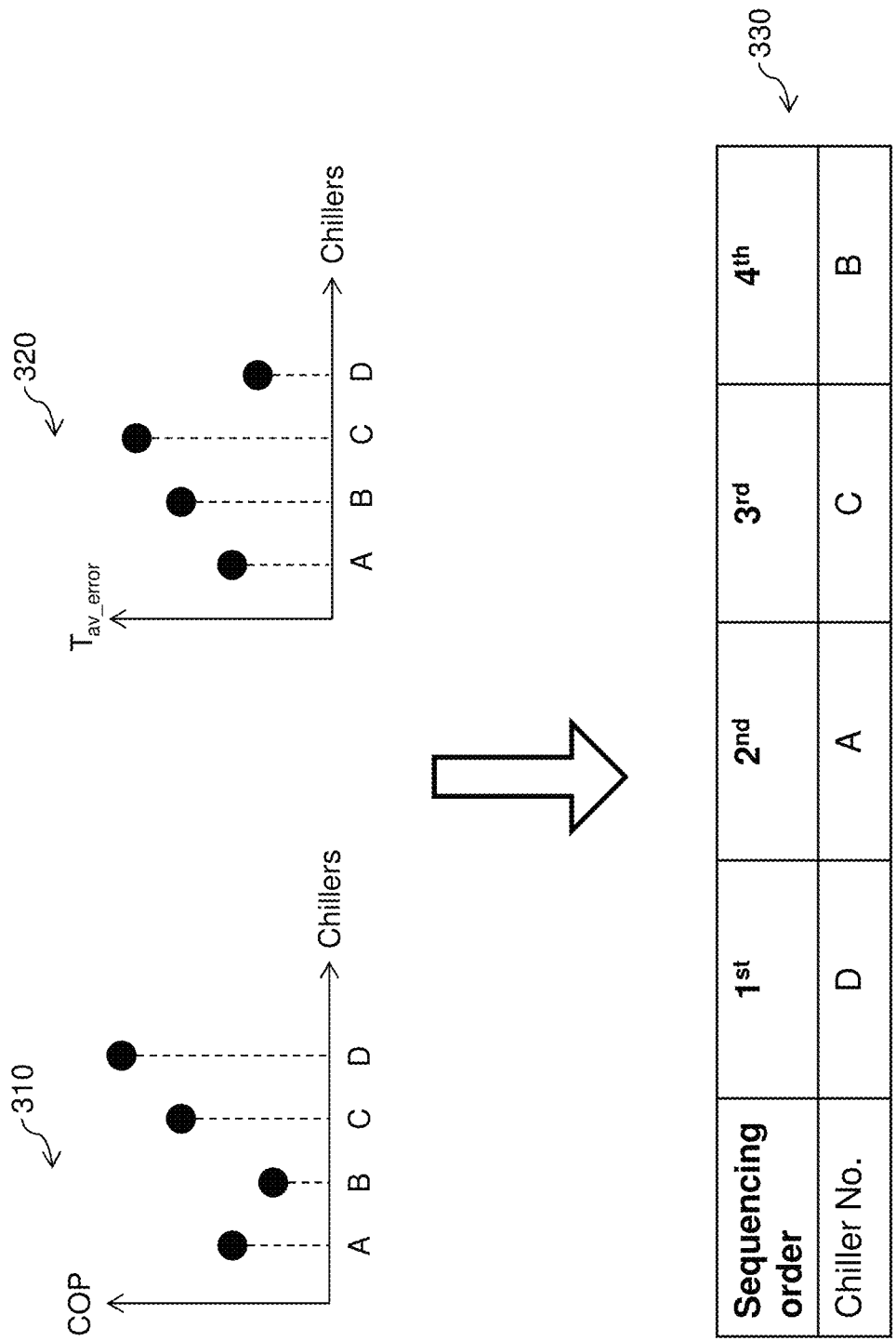
FIG. 3 depicts ranking information in accordance with one or more embodiments.

Now referring to FIG. 3, a graph 310 for chiller rankings based on chiller efficiency in accordance with one or more embodiments is shown. The x-axis of the graph 310 identifies the different chillers (A, B, C, D) within the system and the y-axis measures the chiller efficiency (COP). A ranking order is indicated above each chiller which is based on the calculated efficiency. According to this non-limiting example, the chiller D has the highest efficiency so it has the highest efficiency score, chiller C is next, then chiller A, and finally chiller B has the lowest efficiency so it as the lowest efficiency score.

Still referring to FIG. 3, a graph 320 for chiller rankings based on chiller health in accordance with one or more embodiments is shown. The x-axis of the graph 320 identifies the different chillers (A, B, C, D) within the system and the y-axis measures the chilled water temperature error ($T_{av\_error}$). A ranking order is indicated above each chiller which is based on the calculated health score. In this particular non-limiting example, the chiller D has the lowest error margin so it has the highest health score, followed by chiller A, then chiller B, and lastly chiller C. Similarly, which is not shown in the figures, one could also get the ranking order of chillers for mechanical fatigue wear, noise level, vibration level, if sensor values are available.

In one or more embodiments, the rankings provided in graph 310 and/or graph 320 can be used to determine the chiller sequencing order as shown in table 330. The table 330 provides the sequencing order determined based on the efficiency ranking and the health ranking. As shown, chiller D receives the first priority for selection, then chiller A, followed by chiller C and finally chiller B. In the event chiller D is not able to produce the cooling for the load, chiller A will be brought online next to maximize the overall efficiency of the chiller system.

Figure 4:
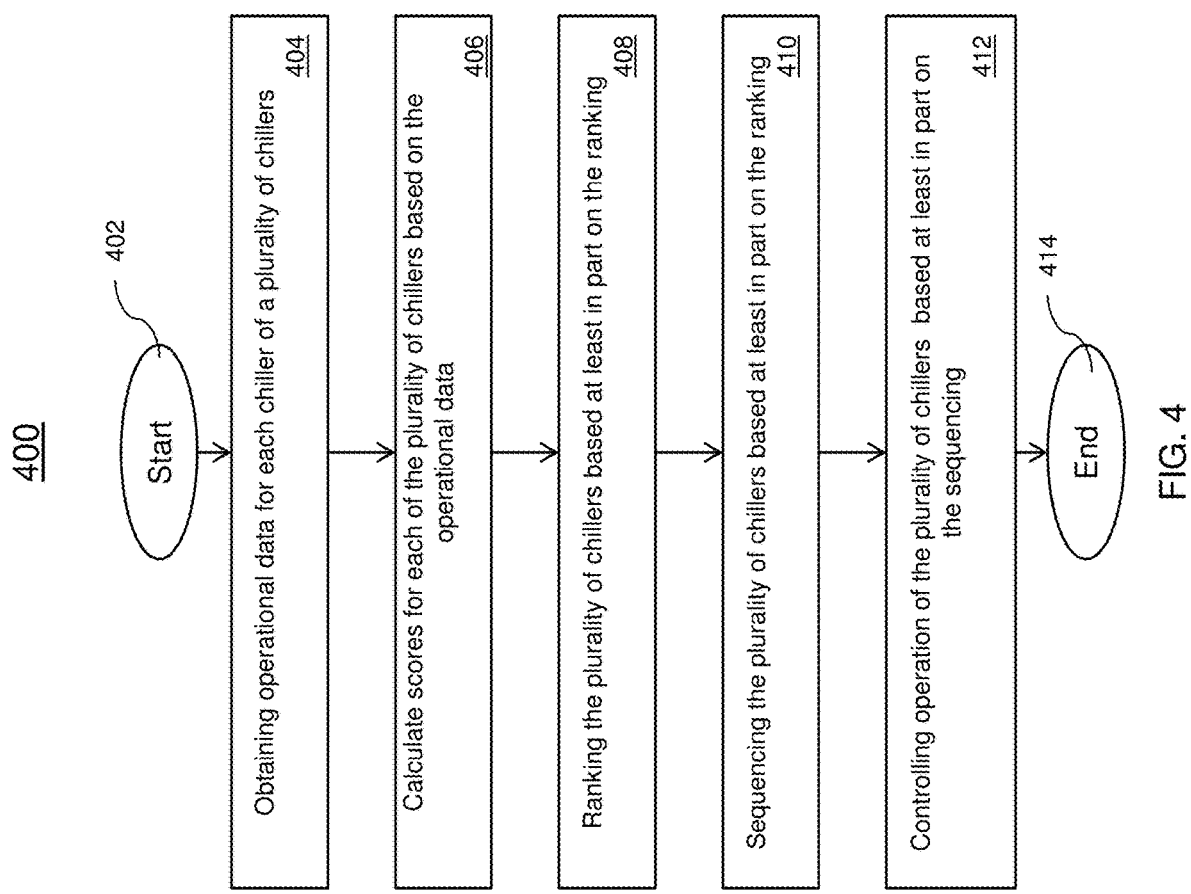
FIG. 4 depicts a flowchart for performing analytics based chiller sequencing in accordance with one or more embodiments.

In FIG. 4, a flowchart of a method 400 for performing analytics based chiller sequencing in accordance with one or more embodiments is shown. It is to be understood that the method 400 can be performed by any of the systems of FIGS. 1 and 2 and also systems having different configurations. The method 400 begins at block 402 and proceeds to block 404 which provides for obtaining operational data for each chiller of a plurality of chillers. The operational data can include motor current/voltage, condenser, economizer, cooler, refrigerant pressures, compressor discharge temperature, water flow meters, water temperature, etc. It is to be understood the operational data can include any data that is monitored and/or controlled by the chillers controller.

At block 406, the method 400 provides for calculating scores for each of the plurality of chillers. The scores include an efficiency score and a health score. The efficiency score indicates how efficiently the chiller is operating based on the capacity and input power of the compressor for each chiller. The efficiency score can be calculated and/or estimated according to the Equations provided above. The health score indicates the ability of the chiller to provide the chilled water at the desired temperature (accuracy) or the stability of the chiller. In one or more embodiments, the chilled water supply temperature can be measured and compared to the chilled water supply temperature setpoint to determine an error. The error values for each chiller can be averaged over time and used to rank the chillers according to the health score.

The method 400 at block 408 provides for ranking the plurality of chillers based on the scores. The chillers can be ranked according to at least one of the efficiency scores and health scores. At block 410, the method 400 provides for sequencing the plurality of chillers based at least in part on the ranking. In one or more embodiments the sequencing is based on combining the efficiency rank/score and the health rank/score to determine an overall rank/score. In one or more embodiments, the efficiency and health rank/score can be weighted according to the needs of the system. The weights provided to the efficiency score and the health score can be configured by an operator.

Block 412 provides for controlling operation of the plurality of chillers based on the sequencing. In the event the currently operated chiller is unable to meet the requirements of the desired load, a subsequent chiller is brought online according to the prioritized sequence based on the efficiency and health of the chillers. In one or more embodiments, the method 400 can be repeated at configurable intervals. The method 400 ends at block 414.

The techniques provided herein allow for the sequencing adjustment of an order of chillers in an automatic fashion without human intervention that factors both of the chiller efficiency and health scores.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for performing analytics based chiller sequencing, the system comprising:
    a plurality of chillers, wherein each chiller of the plurality of chillers comprises a compressor and a condenser;
    a controller configured to control the plurality of chillers;
    one or more sensors in communication with the controller, the one or more sensors configured to generate operational data based on measured operational parameters of the plurality of chillers;
    wherein the controller comprises a processor configured to:
        obtain the operational data, wherein the operational data comprises mechanical fatigue wear including at least one of a noise level or a vibration level;
        calculate scores for each of the plurality of chillers based on the operational data;
        rank the plurality of chillers based on the scores;
        sequence the plurality of chillers based at least in part on the ranking; and
        control operation of the plurality of chillers based on the sequencing.

2. The system of claim 1, wherein the scores for each chiller comprise at least one of an efficiency score and a health score.

3. The system of claim 2, wherein the scores comprise a weighted score of the at least one efficiency score and health score.

4. The system of claim 2, wherein the processor is configured to calculate the efficiency score based on a chilled water capacity and power consumed for each chiller.

5. The system of claim 2, wherein the processor is configured to estimate the efficiency score based on an estimated chilled water capacity and power consumed for each chiller.

6. The system of claim 2, wherein the health score is based on a chilled water supply temperature and a chilled water supply temperature setpoint for each chiller.

7. The system of claim 2, wherein the health score is based on at least one of a mechanical fatigue wear level, a noise level, or a vibration level for each chiller.

8. The system of claim 2, wherein the ranking includes performing a first ranking based on the efficiency score and performing a second ranking based on the health score.

9. The system of claim 1, wherein the controller is configured to resequence the plurality of chillers at a configurable interval.

10. A method for performing analytics based chiller sequencing, the method comprising:
    obtaining operational data for each chiller of a plurality of chillers, wherein each chiller comprises a compressor and a condenser, wherein the operational data comprises mechanical fatigue wear including at least one of a noise level or a vibration level;
    calculating scores for each of the plurality of chillers based on the operational data;
    ranking the plurality of chillers based on the scores;
    sequencing the plurality of chillers based at least in part on the ranking; and
    controlling operation of the plurality of chillers based on the sequencing.

11. The method of claim 10, wherein the scores for each chiller comprise at least one of an efficiency score and a health score.

12. The method of claim 11, further comprising weighting the at least one efficiency score and health score.

13. The method of claim 11, further comprising calculating the efficiency score based at least in part on a measured chilled water capacity and power consumed for each chiller.

14. The method of claim 11, further comprising estimating the efficiency score based at least in part on an estimated chilled water capacity and power consumed for each chiller.

15. The method of claim 11, wherein the health score is based on a chilled water supply temperature and a chilled water supply temperature setpoint for each chiller.

16. The system of claim 11, wherein the health score is based on at least one of a mechanical fatigue wear level, a noise level, or a vibration level for each chiller.

17. The method of claim 11, wherein the ranking includes performing a first ranking based on the efficiency score and performing a second ranking based on the health score.

18. The method of claim 10, further comprising resequencing the plurality of chillers at a configurable interval.

19. The method of claim 11, further comprising calculating the efficiency score when flow sensor data for each chiller is available.

20. The method of claim 11, further comprising estimating the efficiency score when flow sensor data for each chiller is unavailable.

* * * * *